(12) United States Patent
Albrecht et al.

(10) Patent No.: US 8,160,880 B2
(45) Date of Patent: Apr. 17, 2012

(54) GENERALIZED OBJECT RECOGNITION FOR PORTABLE READING MACHINE

(75) Inventors: Paul Albrecht, Bedford, MA (US); Rafael Maya Zetune, Chestnut Hill, MA (US); Lucy Gibson, Belmont, MA (US); Raymond C. Kurzweil, Newton, MA (US)

(73) Assignee: K-NFB Reading Technology, Inc., Wellesley Hills, MA (US)

( * ) Notice: Subject to any disclaimer, the term of this patent is extended or adjusted under 35 U.S.C. 154(b) by 986 days.

(21) Appl. No.: 12/110,669

(22) Filed: Apr. 28, 2008

(65) Prior Publication Data

US 2009/0048842 A1  Feb. 19, 2009

Related U.S. Application Data

(60) Provisional application No. 60/915,090, filed on Apr. 30, 2007.

(51) Int. Cl.
*G10L 13/08* (2006.01)

(52) U.S. Cl. ........ 704/260; 704/266; 704/259; 704/269; 704/3

(58) Field of Classification Search .................. 704/260, 704/266, 259, 2
See application file for complete search history.

(56) References Cited

U.S. PATENT DOCUMENTS

| | | | |
|---|---|---|---|
| 7,272,593 B1 * | 9/2007 | Castelli et al. | 707/600 |
| 7,659,915 B2 * | 2/2010 | Kurzweil et al. | 345/698 |
| 2007/0214172 A1 * | 9/2007 | Nister et al. | 707/102 |
| 2007/0217676 A1 * | 9/2007 | Grauman et al. | 382/170 |

* cited by examiner

*Primary Examiner* — Qi Han
(74) *Attorney, Agent, or Firm* — Fish & Richardson P.C.

(57) ABSTRACT

Techniques for operating a reading machine are disclosed. The techniques include forming an N-dimensional features vector based on features of an image, the features corresponding to characteristics of at least one object depicted in the image, representing the features vector as a point in n-dimensional space, where n corresponds to N, the number of features in the features vector and comparing the point in n-dimensional space to a centroid that represents a cluster of points in the n-dimensional space corresponding to a class of objects to determine whether the point belongs in the class of objects corresponding to the centroid.

28 Claims, 8 Drawing Sheets

GENERALIZED OBJECT RECOGNITION FOR PORTABLE READING MACHINE

This application claims priority under 35 U.S.C. §119(e) to provisional U.S. Patent Application 60/915,090, filed on Apr. 30, 2007, the entire contents of which are hereby incorporated by reference.

BACKGROUND

Reading machines use optical character recognition (OCR) and text-to-speech (TTS) i.e., speech synthesis software to read aloud and thus convey printed matter to visually and developmentally impaired individuals. Reading machines read text from books, journals, and so forth.

Reading machines can use commercial off-the-shelf flatbed scanners, a personal computer and the OCR software. Such a reading machine allows a person to open a book and place the book face down on the scanner. The scanner scans a page from the book and the computer with the OCR software processes the image scanned, producing a text file. The text file is read aloud to the user using text-to-speech software.

Reading can be viewed broadly as conveying content of a scene to a user. Reading can use optical mark recognition, face recognition, or any kind of object recognition. A scene can represent contents of an image that is being read. A scene can be a memo or a page of a book, or it can be a door in a hallway of an office building. The types of real-world contexts to "read" include visual elements that are words, symbols or pictures, colors and so forth. In addition, reading machines can include software that a user can use to train a reading machine to recognize objects.

SUMMARY

According to an aspect of the present invention, According to an aspect of the present invention, a method of operating a reading machine, the method including forming an N-dimensional features vector based on features of an image, the features corresponding to characteristics of at least one object depicted in the image, representing the features vector as a point in n-dimensional space, where n corresponds to N, the number of features in the features vector and comparing the point in n-dimensional space to a centroid that represents a cluster of points in the n-dimensional space corresponding to a class of objects to determine whether the point belongs in the class of objects corresponding to the centroid.

The following are within the scope of the present invention. The image is a received image from an image input device associated with the reading machine. The method further includes normalizing the data that populates the array to account for spatial variations. The method further includes capturing an image or series of images to form a series of arrays. The method further includes retrieving an identification corresponding to a centroid that matches the point in n-dimensional space. The method further includes producing an auditory output to a user to identify the object class.

The method further includes receiving a tolerance associated with the centroid and comparing determines whether the point is within a distance from the centroid that is less than the tolerance associated with the centroid. The tolerance is at least one of variance, standard deviation. The centroid that represents a cluster of points is stored in a database and includes a value of the centroid and identification information that identifies a class of objects that the centroid represents. Forming the N-dimensional features array uses the Scale Invariant Feature Transform (SIFT) to transform image data into scale-invariant coordinates relative to local features.

According to an additional aspect of the present invention, a reading machine includes a processing device, a computer program product residing on a computer readable medium for controlling operation of the reading machine, comprising instructions for causing the machine to receive an image and form an N-dimensional features vector based on features of the received image, the features corresponding to characteristics of at least one object depicted in the image. The program further includes instructions to represent the features vector as a point in n-dimensional space, where n corresponds to N, the number of features in the features vector and compare the point in n-dimensional space to a centroid that represents a cluster of points in the n-dimensional space corresponding to a class of objects to determine whether the point belongs in the class of objects corresponding to the centroid.

The following are within the scope of the present invention. The reading machine further includes an image input device that captures the received image. The computer program product includes instructions to normalize the data that populates the array to account for spatial variations. The computer program product includes instructions to retrieve an identification corresponding to a centroid that matches the point in n-dimensional space. The computer program product includes instructions to produce an auditory output to a user to identify the object class or object associated with the received image. The computer program product includes instructions to receive a tolerance associated with the centroid and determine whether the point is within a distance from the centroid that is less than the tolerance associated with the centroid. The reading machine further includes a database of centroids that represent classes of objects.

According to an additional aspect of the present invention, a computer program product residing on a computer readable medium for object recognition in a reading machine, the computer program product includes instructions for causing the reading machine to receive an image and form an N-dimensional features vector based on features of the received image, the features corresponding to characteristics of at least one object depicted in the image, represent the features vector as a point in n-dimensional space, where n corresponds to N, the number of features in the features vector, and compare the point in n-dimensional space to a centroid that represents a cluster of points in the n-dimensional space corresponding to a class of objects to determine whether the point belongs in the class of objects corresponding to the centroid.

The following are within the scope of the present invention. The computer program product includes instructions to normalize the data that populates the array to account for spatial variations. The computer program product includes instructions to retrieve an identification corresponding to a centroid that matches the point in n-dimensional space. The computer program product includes instructions to produce an auditory output to a user to identify the object class or object associated with the received image. The computer program product of claim 18 includes instructions to receive a tolerance associated with the centroid and determine whether the point is within a distance from the centroid that is less than the tolerance associated with the centroid.

According to an additional aspect of the present invention, a reading machine includes circuitry to receive an image and circuitry to form an N-dimensional features vector based on features of the received image, the features corresponding to characteristics of at least one object depicted in the image, circuitry to represent the features vector as a point in n-dimensional space, where n corresponds to N, the number of features in the features vector and circuitry to compare the point in n-dimensional space to a centroid that represents a cluster of points in the n-dimensional space corresponding to a class of objects to determine whether the point belongs in the class of objects corresponding to the centroid.

The following are within the scope of the present invention.

The reading machine includes an image input device that captures the received image. The reading machine includes circuitry to retrieve an identification corresponding to a centroid that matches the point in n-dimensional space. The reading machine includes circuitry to produce an auditory output to a user to identify the object class or object associated with the received image. The reading machine includes circuitry to receive a tolerance associated with the centroid and circuitry to determine whether the point is within a distance from the centroid that is less than the tolerance associated with the centroid. The reading machine includes a database of centroids that represent classes of objects.

According to an additional aspect of the present invention, a computer implemented method of producing a database representing classes of objects that can be recognized by object recognition software executed on a reading machine includes receiving a plurality of images for different objects within a class of objects, and for an image, producing an array of N features having values for the N features, with the values representing the object, representing the array as a corresponding point in n-dimensional space, where n corresponds to the number N of features in the array, grouping at least some of the points into clusters representing objects of a particular class of objects, and determining a centroid for the clusters of points in the n-dimensional space.

The following are within the scope of the present invention.

The database is stored in a computer readable medium. The method includes producing information that identifies the class or a sub-class of the object represented in the image. The method includes storing the information that identifies the class of sub-class of the object with the centroid. The method includes applying a Scale Invariant Feature Transform image data to transform the data of the image into scale-invariant coordinates relative to local features in the image. The method includes producing key-points that are invariant to image rotation and scale and robust across a substantial range of affine distortion, addition of noise, and change in illumination to produce the feature array.

According to an additional aspect of the present invention, a computer program product residing on a computer readable medium for producing a database representing classes of objects that can be recognized by object recognition software executed on a reading machine, the computer program product includes instructions for causing the reading machine to receive a plurality of images for different objects within a class of objects, and for an image, produce an array of N features having values for the N features, with the values representing the object, represent the array as a corresponding point in n-dimensional space, where n corresponds to the number N of features in the array, group at least some of the points into clusters representing objects of a particular class of objects, and determine a centroid for the clusters of points in the n-dimensional space.

One or more aspects of the invention may provide one or more of the following advantages.

The reading device is configured to operate in different modes. The modes can be configured to more effectively provide functionality to the user, especially blind and visually impaired users. This allows a user to use the reading device and navigate in much the same way as sighted individuals would navigate a document. The reading device can use a template together with user initiated commands to control processing of the reading device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
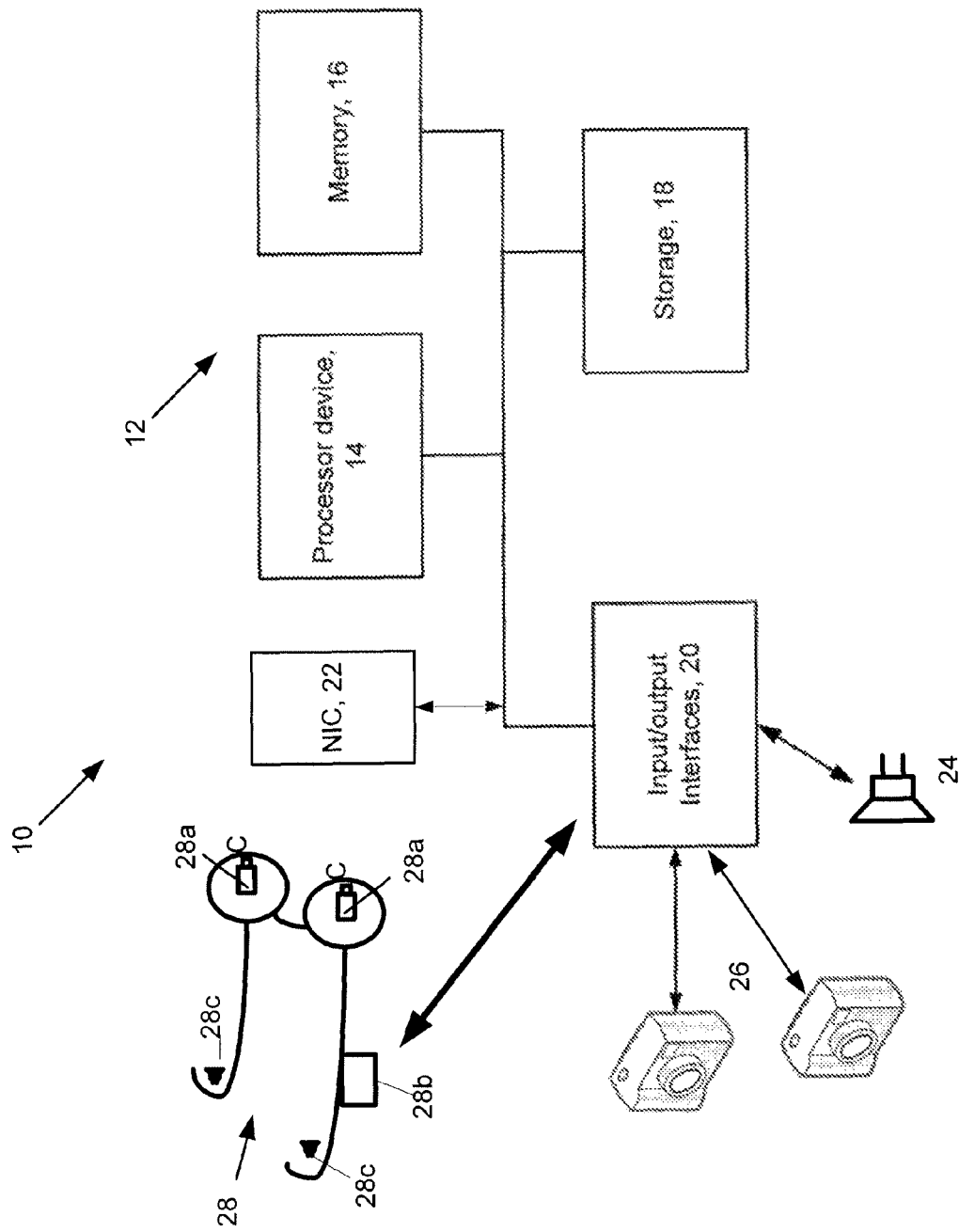
FIG. 1 is a block diagram depicting a typical configuration for a portable reading machine.

Referring to FIG. 1 a configuration of a portable reading machine 10 is shown. The portable reading machine 10 includes a portable computing device 12 and image input device 26, e.g. here two cameras, as shown. Alternatively, the portable reading machine 10 can be a camera with enhanced computing capability and/or that operates at multiple image resolutions. The image input device, e.g. still camera, video camera, portable scanner, collects image data to be transmitted to the processing device. The portable reading machine 10 has the image input device coupled to the computing device 12 using a cable (e.g. USB, Firewire™) or using wireless technology (e.g. Wi-Fi, Bluetooth™, wireless USB) and so forth. An example is consumer digital camera coupled to a pocket PC or a handheld Windows or Linux PC, a personal digital assistant and so forth. The portable reading machine 10 will include various computer programs to provide reading functionality as discussed below.

In general as in FIG. 1, the computing device 12 of the portable reading machine 10 includes at least one processor device 14, memory 16 for executing computer programs and persistent storage 18, e.g., magnetic or optical disk, PROM, flash Prom or ROM and so forth that permanently stores computer programs and other data used by the reading machine 10. In addition, the portable reading machine 10 includes input and output interfaces 20 to interface the processing device to the outside world. The portable reading machine 10 can include a network interface card 22 to interface the reading machine to a network (including the Internet), e.g., to upload programs and/or data used in the reading machine 10.

The portable reading machine 10 includes an audio output device 24 to convey synthesized speech to the user from various ways of operating the reading machine. The camera and audio devices can be coupled to the computing device using a cable (e.g. USB, Firewire™) or using wireless technology (e.g. Wi-Fi, Bluetooth™) etc.

The portable reading machine 10 may have two cameras, or video input devices 26, one for high resolution and the other for lower resolution images. The lower resolution camera may be support lower resolution scanning for capturing gestures or directed reading, as discussed below. Alternatively, the portable reading machine may have one camera capable of a variety of resolutions and image capture rates that serves both functions. The portable reading machine can be used with a pair of "eyeglasses" 28. The eyeglasses 28 may be integrated with one or more cameras 28a and coupled to the portable reading machine, via a communications link. The eyeglasses 26 provide flexibility to the user. The communications link 28b between the eyeglasses and the portable reading machine can be wireless or via a cable, as discussed above. The Reading glasses 28 can have integrated speakers or earphones 28c to allow the user to hear the audio output of the portable reading machine. The reading machine 10 includes image stabilization, zoom, image preprocessing, and image and text alignment functions, as generally discussed below.

A tablet PC and remote camera could be used with computing device 12 to provide another embodiment of the portable reading machine 10. The portable reading machine 10 can be implemented as a handheld camera with input and output controls.

The portable reading machine 10 can also be implemented as a mobile telephone, e.g., so-called smart phones such as the Nokia N95 (Nokia, Inc.) having an image input device and enhanced computing resources. Such a smart phone can be modified to have the computing resources execute application software that implements reading machine functionality (discussed below).

Figure 2:
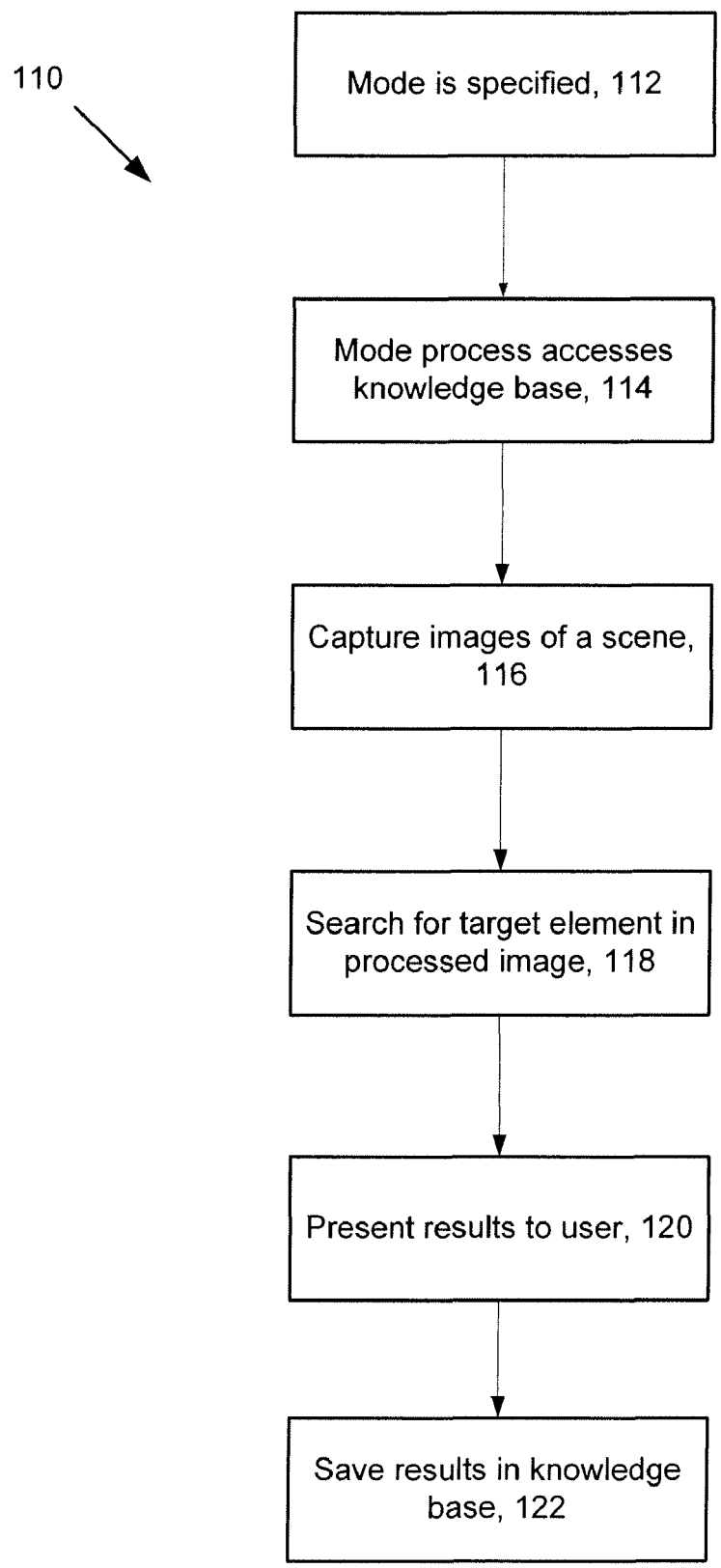
FIG. 2 is a flow chart depicting operating overview of the reading machine.

Referring to FIG. 2, a process 110 for operating the reading machine is shown. Various modes can be incorporated in the reading machine, as discussed in U.S. Published application Ser. No. 11/097,956, filed Apr. 1, 2005 publication no. US 2005-0286743 A1, and entitled: "Portable Optical Reader for the Blind", which is incorporated herein by reference in its entirety.

The reading machine captures 116 one or several images of a scene and processes the image to identify 118 one or more target elements in the scene using information obtained from the knowledge base. An example of a target element is a number on a door or an exit sign. Upon completion of processing of the image, the reading machine presents 120 results to a user. Results can be presented in various ways, but generally is as speech or other output to convey information to the user. In some embodiments, the reading machine processes the image(s) using more than one mode and presents the result to a user based on an assessment of which mode provided valid results.

The modes can incorporate a "learning" feature so that the user can save 122 information from processing a scene so that the same context is processed easier the next time.

Object Recognition

In some embodiments, the reading machine includes software that allows a user to train the reading machine to recognize everyday objects in the user's environment. Generally, due to various limitations such as the availability of memory and processing speed, such object recognition would be limited to a relatively few objects and indeed may not be able to recognize different objects that are of the class as those objects recognized. For instance, with a user's training a reading machine using pattern matching based on defined templates, as disclosed in the above mentioned application, it may be possible to allow the user to train the reading machine to recognize the user's dog, but it would be less likely that the reading machine could recognize a different breed of dog based on the user-defined templates used to recognize the user's dog. Published Application US 2005-0286743 A1 mentioned above describes various template based object recognition techniques.

Generalized Object Recognition

The reading machine 10 includes generalized object recognition, as will now be described. This generalized object recognition is based on training an algorithm using many different images of objects and constructing a compressed set of data to represent features of many examples of many objects. One source of images could be the Internet, whereas other sources could be used.

Figure 3:
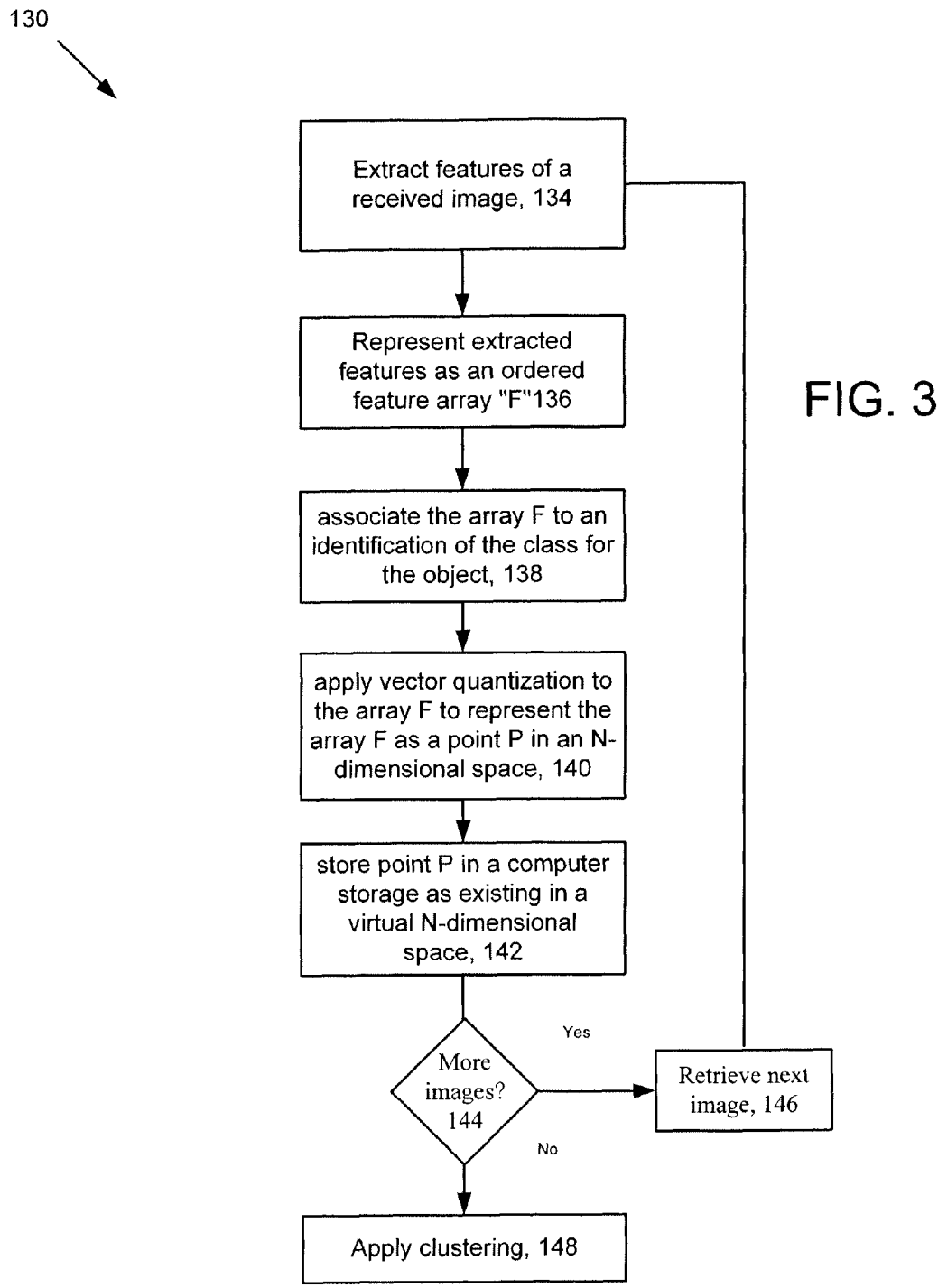
FIG. 3 is a flow chart of an object recognition training mode.

Referring to FIG. 3, an object recognition training mode 130 is provided. Due the complexity of processing and data storage in the object recognition training mode 130, it is preferred that the object recognition training mode 130 is run as an off-line process that produces data that is either built-into reading machines, downloaded to reading machines, supplied via a memory card, etc. to enable reading machines to recognize various classes of objects in conjunction with a generalized object recognition application discussed below.

In order to recognize various classes of objects, the training mode 130 exams a large number of examples of objects for each class. The examples are in the form of images of different object examples for each class of objects. Preferably, the training mode is conducted on images of objects against a bland or neutral background, such that artifacts of the background are not incorporated into data that describes features of the object being trained. Thus, for instance, if it was desired to have the reading machine recognize fifty (50) different classes of objects, it may be necessary to develop a database for the reading machine that is based on several hundred or up to one or two thousand or more examples of objects for each class of object, and thus upwards of e.g., 10,000 or more examples of objects for 50 classes of objects could be required.

As used herein "object" refers to examples of "things" that are used to develop the database. For instance, objects can be different breeds of dogs or different dogs within a particular breed. "Class," on the other hand, will refer to the general classification of the things or objects that are used during training mode. Thus, "class" refers to the class of objects that are "dogs," whereas "objects" are the individual examples of "dogs." Class can have fine or coarse granularity. Thus, while the process below is described using different dogs as objects for the class "dogs" and different cats as objects for the class "cats," the class can be comprised of sub-classes. Thus, another application could train based on "breeds of dogs" and "breeds of cats" using images of a particular breed for training for the particular breed of the breed of dogs class, providing a sub-class of dogs by breed a super-class of dogs of all breeds etc.

In the training mode 130, for each class, a features generator 132 extracts 134 features of a received image from the image using various recognition techniques. These features are values for lines and curves that are processed from the features extracted from the image. Each class of objects has images with the same pose, e.g., position/orientation. The features generator 132 also represents 134 the features of an object as a vector.

The training mode can normalize the images prior to feature generator processing to account for spatial differences involved in the various images. One manner in which feature data can be normalized is to provide the images as full frames prior to processing by the feature generator.

For any particular class of objects, each member of the class, e.g., example object, has the extracted features represented 136 as a one dimensional, ordered feature array or vector "F" and associated 138 with the array F is an identification of the class for the object, e.g., dog face view; dog frontal view; dog, side view; and so forth.

Figure 3A:
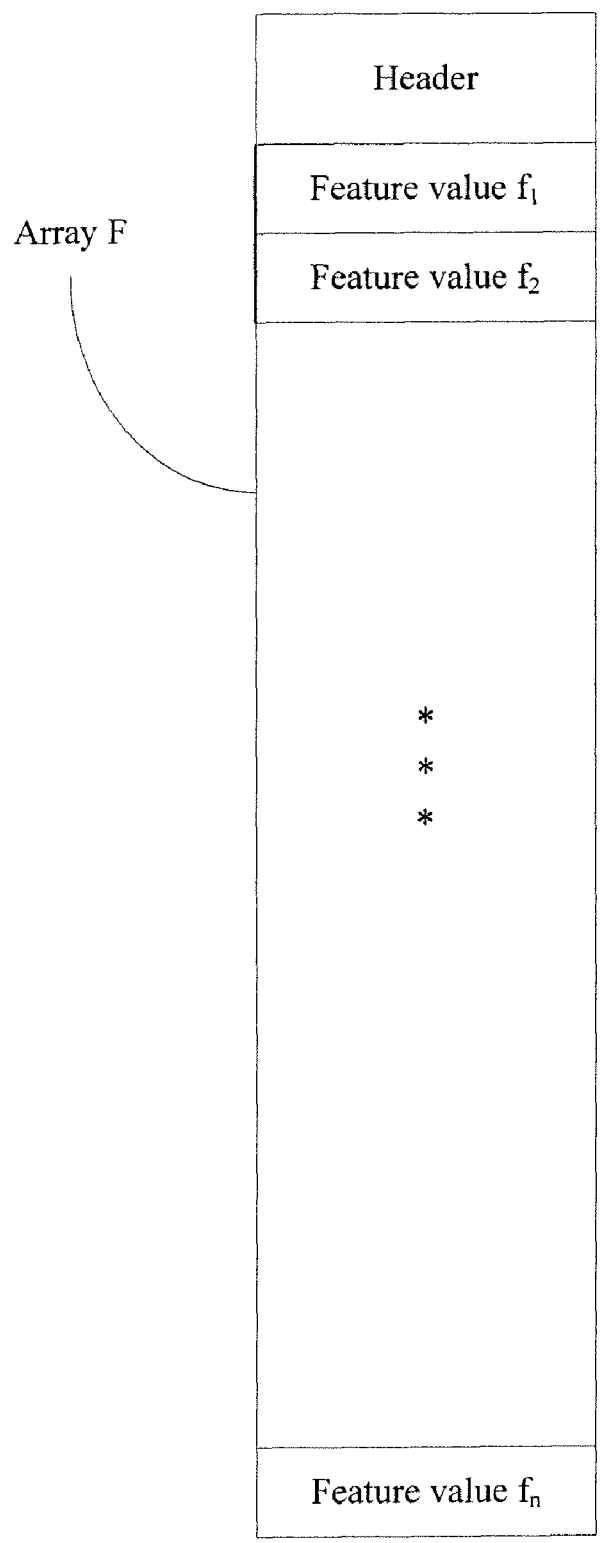
FIG. 3A is a diagram depicting an ordered feature array.

An exemplary ordered array is depicted in FIG. 3A and includes fields that identify the object, e.g., in a header and fields that correspond to values of the features extracted from the image. In the header various data can be stored, such as the identification of the image used to produce the array, the identification of the object the class of the object and so forth. Each image that is processed through the feature generator will produce a corresponding one-dimensional ordered feature array.

In the value fields $f_1$ to $f_n$ the normalized values of features, e.g., lengths, curvature etc. for particular features are stored. In some instances for a particular image some of the fields of $f_1$ to $f_n$ may be left blank, if for instance a particular feature corresponding to that field is not found in the processed image.

The training mode 130 applies 140 vector quantization to the array F to represent the array F, as a point P in an N-dimensional space, where N is equal to the number of features in the features array F.

The training mode 130 stores 144 this point P in computer storage as existing in a virtual N-dimensional space. The training mode 130 determines 146 if there are more images of objects to process, and thus processes each image of the objects for the class C, producing a point P in N-dimensional space for each object.

After all objects in a class have been processed (or alternatively after all objects in all classes have been processed), the training mode 130 finds 148 groupings or clusters of points P, belonging to the same class.

Figure 3B:
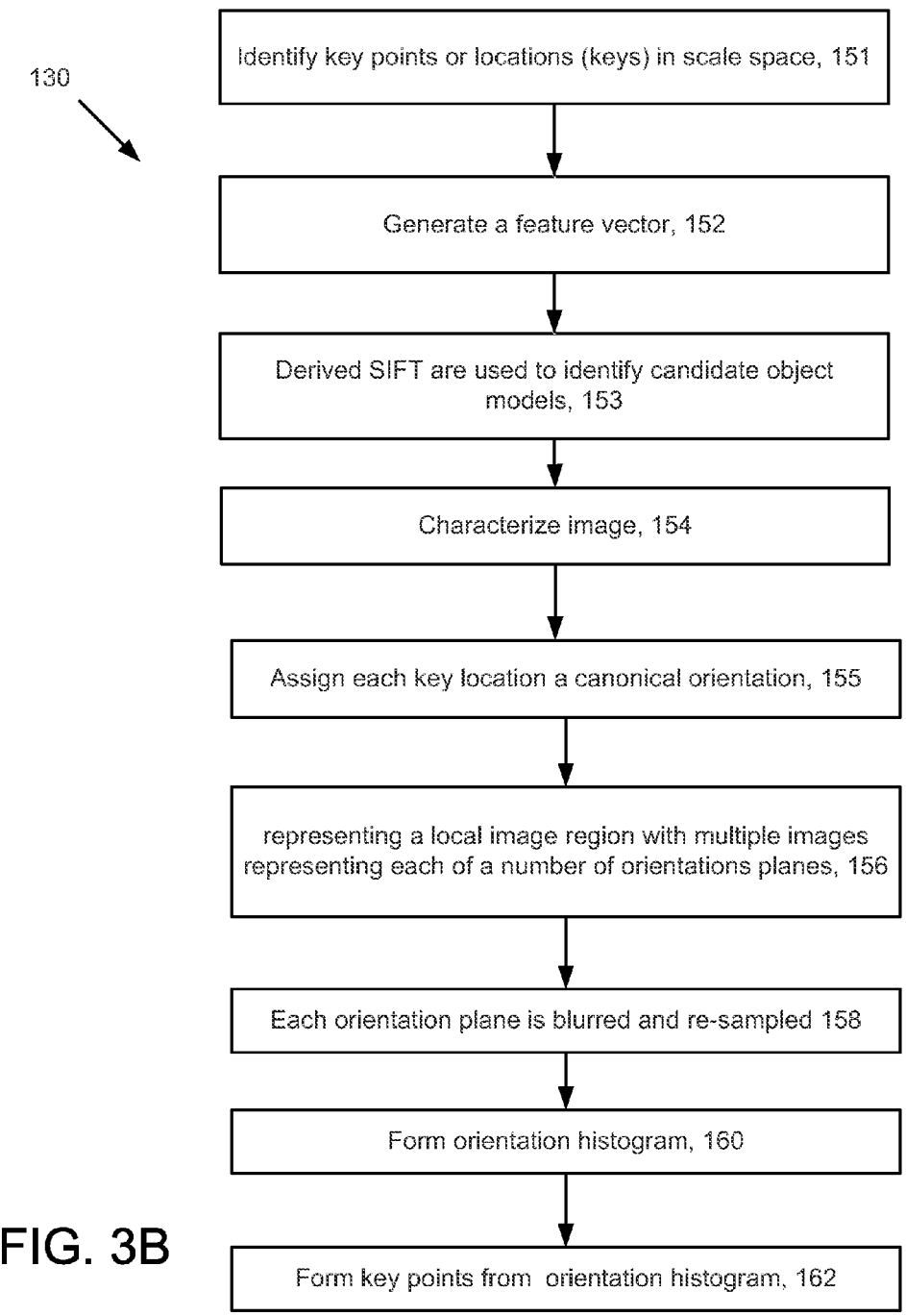
FIG. 3B is a flow chart depicting a technique to produce the ordered feature array.

Referring now to FIG. 3B, an example of the feature generator 132 is shown. Other approaches to provide feature generators can be used. In essence, the feature generator 132 identifies distinctiveness in an mage by assembling a large-dimensional vector to represent image gradients within a local region of the image. Key-points that are invariant to image rotation and scale and robust across a substantial range of affine distortion, addition of noise, and change in illumination are identified.

The "so called" Scale Invariant Feature Transform (SIFT), can be used to transform image data into scale-invariant coordinates relative to local features. One aspect of this approach is that it generates a large number of features that densely cover the image over the full range of scales and locations.

The scale-invariant features (SIFT) are identified by using staged filtering, in which key points or locations (keys) in scale space are identified 151 by looking for locations that are maxima or minima of a difference-of-Gaussian function.

Each key point is used to generate 152 a feature vector that represents the local image region sampled relative to its scale-space coordinate frame. The features achieve partial invariance to local variations, such as affine or 3D projections, by blurring image gradient locations.

The scale-invariant features key points derived from an image are used 153 in a nearest-neighbor approach to index and identify candidate object models. Collections of keys that collate on a potential model pose are identified through, e.g., a Hough transform hash table and through a least-squares fit to a final estimate of model parameters. When at least 3 keys agree on the model parameters with low residual, there is strong evidence for the presence the key in the object. Since there may be dozens of SIFT keys in the image of a typical object, it is possible to have substantial levels of occlusion in the image and yet retain high levels of reliability.

To achieve rotation invariance and a high level of efficiency, key locations are chosen at maxima and minima of a difference of Gaussian function applied in scale space. This difference is computed by building an image pyramid of a series of levels of orientation differences with re-sampling performed between each level of orientation differences.

Thus, the feature generator locates key points at regions and scales of high variation, making these locations particularly stable for characterizing 154 the image. To characterize 154 the image at each key location, the smoothed image at each level of the pyramid is processed to extract image gradients and orientations.

Robustness to illumination change is enhanced by comparing illumination changes to a threshold with gradient magnitudes at a value of 0.1 times the maximum possible gradient value. This reduces the effect of a change in illumination direction for a surface with 3D relief, as an illumination change may result in large changes to gradient magnitude but is likely to have less influence on gradient orientation.

Each key location is assigned 155 a canonical orientation so that the image descriptors are invariant to rotation. In order to make the image descriptors as stable as possible against lighting or contrast changes, the orientation is determined by the peak in a histogram of local image gradient orientations.

Given a stable location, scale, and orientation for each key, the local image region can be represented in a manner that is invariant to these transformations. In addition, it is desirable to make this representation robust against small shifts in local geometry, such as arise from affine or 3D projection. This robustness to local geometric distortion can be obtained by representing 156 the local image region with multiple images representing each of a number of orientations (referred to as orientation planes). Each orientation plane contains only the gradients corresponding to that orientation, with linear interpolation used for intermediate orientations.

Each orientation plane is blurred and re-sampled 158 to allow for larger shifts in positions of the gradients. For each key point, e.g., a pixel sampling from the pyramid level at which the key was detected is used. Pixels that fall in a circle of radius of e.g., 8 pixels around the key location are inserted into the orientation planes. The orientation is measured relative to that of the key by subtracting the key's orientation.

An orientation histogram 160 is formed from the gradient orientations of sample points within a region around the key point. The orientation histogram has, e.g., 36 bins covering the 360 degree range of orientations. Each sample added to the histogram is weighted by its gradient magnitude and by a Gaussian-weighted circular window with a size that is 1.5 times that of the scale of the key point.

The orientation histogram is used to form key points 162 having multiple orientations. Peaks in the orientation histogram correspond to dominant directions of local gradients. The highest peak in the histogram is detected, and any other local peak that is within 80% of the highest peak is used to also produce a key point with that orientation. Therefore, for locations with multiple peaks of similar magnitude, there will be multiple key points produced at the same location and scale but with different orientations. Only about 15% of points are assigned multiple orientations, but these contribute significantly to the stability of matching. In addition, a parabola is fit to the 3 histogram values closest to each peak to interpolate the peak position for better accuracy.

The image gradient magnitudes and orientations are sampled around the key point location, using the scale of the key point to select the level of Gaussian blur for the image. In order to achieve orientation invariance, the coordinates of the descriptor and the gradient orientations are rotated relative to the key point orientation.

The descriptor is formed from a vector containing the values of all the orientation histogram entries, corresponding to the lengths of the arrows.

Parameters can be used to vary the complexity of the descriptor. For instance, the number of orientations, "r" in the histograms, and the width, "n", of an n X n array of orientation histograms can be used.

The recognition performance could be further improved by adding new SIFT feature types to incorporate color, texture, and edge groupings, as well as varying feature sizes and offsets. Scale-invariant edge groupings that make local figure-ground discriminations would be particularly useful at object boundaries where background clutter can interfere with other features.

Figure 4:
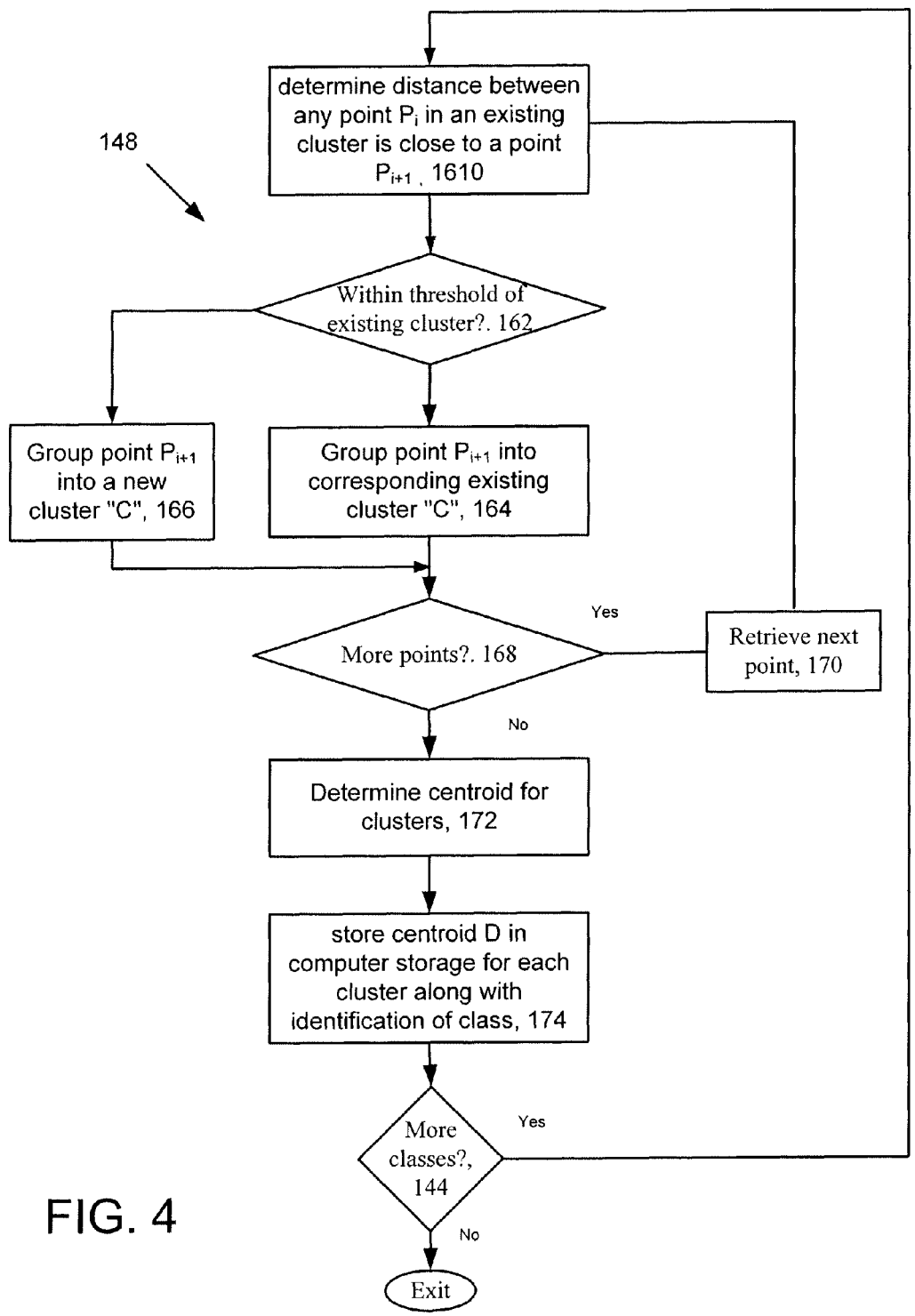
FIG. 4 is a flow chart detailing clustering used in the object recognition training mode.

Referring now to FIG. 4, details on clustering 148 are shown. For a particular point Pi in N-dimensional space, clustering 148 determines 160 whether that point Pi is close to another point Pi+1 of the same class, by determining the distance between those points as $X=P_{i+1}-P_i$ in the N-dimensional space and comparing the distance X to a threshold value T.

The clustering algorithm determines the distance X (here in two dimensional space for illustration, but in practice, n-dimensional space) between all of the points, and groups them into the clusters provided that the distance X is less than or equal to the threshold value T, and that the class of each point is the same. As an example, the clustering algorithm determines 160 the distance X between a point $P_{i+1}$ and any point in each existing cluster, compares 162 that distance X to the threshold T and determines whether the point $P_{i+1}$ belongs in the existing cluster 164 or whether the point $P_{i+1}$ belongs in a new cluster 166.

The clustering algorithm determines 168 whether there are more points. If so, the clustering algorithm retrieves 170 the next point and continues processing, as shown. On the other hand, if there are not any more points to cluster, the process finds 172 a centroid for each determined cluster. Finding a centroid involves finding a point that best represents the cluster, e.g., is at the center of the cluster or which is clustered around the predominant number of points in the cluster. Clustering techniques as applied in speech recognition can be adapted for the clustering described above.

Thus, the clustering algorithm group points into clusters and from the cluster a centroid if found that is used to represent the points and all possible points in the cluster. Each cluster has associated with the cluster an identification of the object type. The centroid "D," is the point P in N-dimensional space, which along with a determined tolerance, variance or standard deviation represents that particular cluster. The centroid D is that point in the cluster (either calculated or an actual point) that is at the center of all of the points in the cluster. The centroid point D, along with the determined tolerance, variance or standard deviation and the identification of the class corresponding to the cluster is stored in a database that is used by the portable reading machine 10. This data along with a recognitions process (discussed below) is loaded onto reading machines to provide a generalized object recognition mode for the reading machines.

Figure 5:
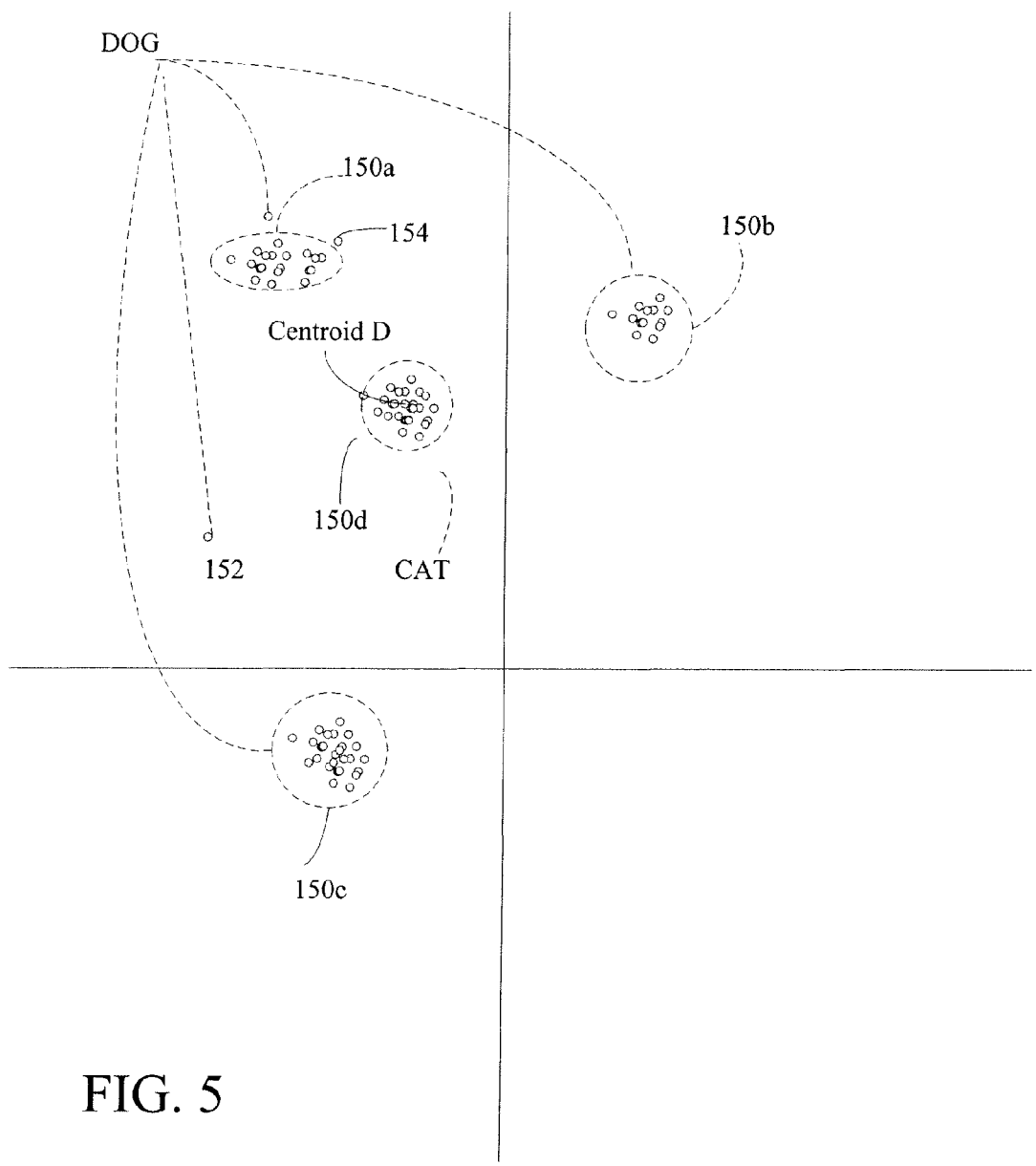
FIG. 5 is a diagram useful for understanding clusters.

Referring now to FIG. 5, there are provided three clusters of "dog" and one cluster of "cats." In this very simplified example in two dimensional space, there are four clusters, 150a-150d, an outlier point 152, and an outlier point 154. In this example, clusters 150a, 150b and 150c represent the class of objects "dogs", whereas cluster 150d represents the class of objects "cats." The outlier point 152 is an example of a dog and the outlier point 154 is an example of the class "cats."

While, the point 154 is close to the cluster of the class "dog," it actually belongs to the class of "cats" but is not included in either cluster dog or cat, since the distance between the point 154 and the nearest point in any of the clusters of "cats" is beyond the threshold "t" for "cats." Similarly, the point 152 is beyond the threshold t for "dog" and is not included in any cluster. Both points 152 and 154 are considered outliers or more correctly, noise in the data, and can be ignored. Accordingly, there can be another requirement for forming clusters, which is that the cluster has a minimum number of members. Generally, that number is determined empirically.

This approach of using a centroid to represent the data is a compression technique that reduces the amount of data that needs to be stored and processed by the portable reading machine 10 in comparison to the ordered arrays used to represent each object in the class produced by the feature generation process discussed above. For any given class of objects, e.g., dog, cat, person, signpost, car, etc. there is likely to exist several clusters and hence several centroids, one for each cluster. In addition, after processing of all points in the class, there may be some points that do not fit into any class. These outliers can be considered as noise and can be discarded.

Variations in the grouping are possible. For instance, the process has been described as involving determinations of clusters for each class of objects, sequentially. Thus, as described, a first class of objects are processed, clustered and represented as a centroid and a second class of objects are processed, clustered and represented as a centroid, and so forth. This need not be the case and instead objects from different classes can be processed, clustered and the clusters represented as centroids and the centroids identified by the class.

Generalized Object Recognition

Figure 6:
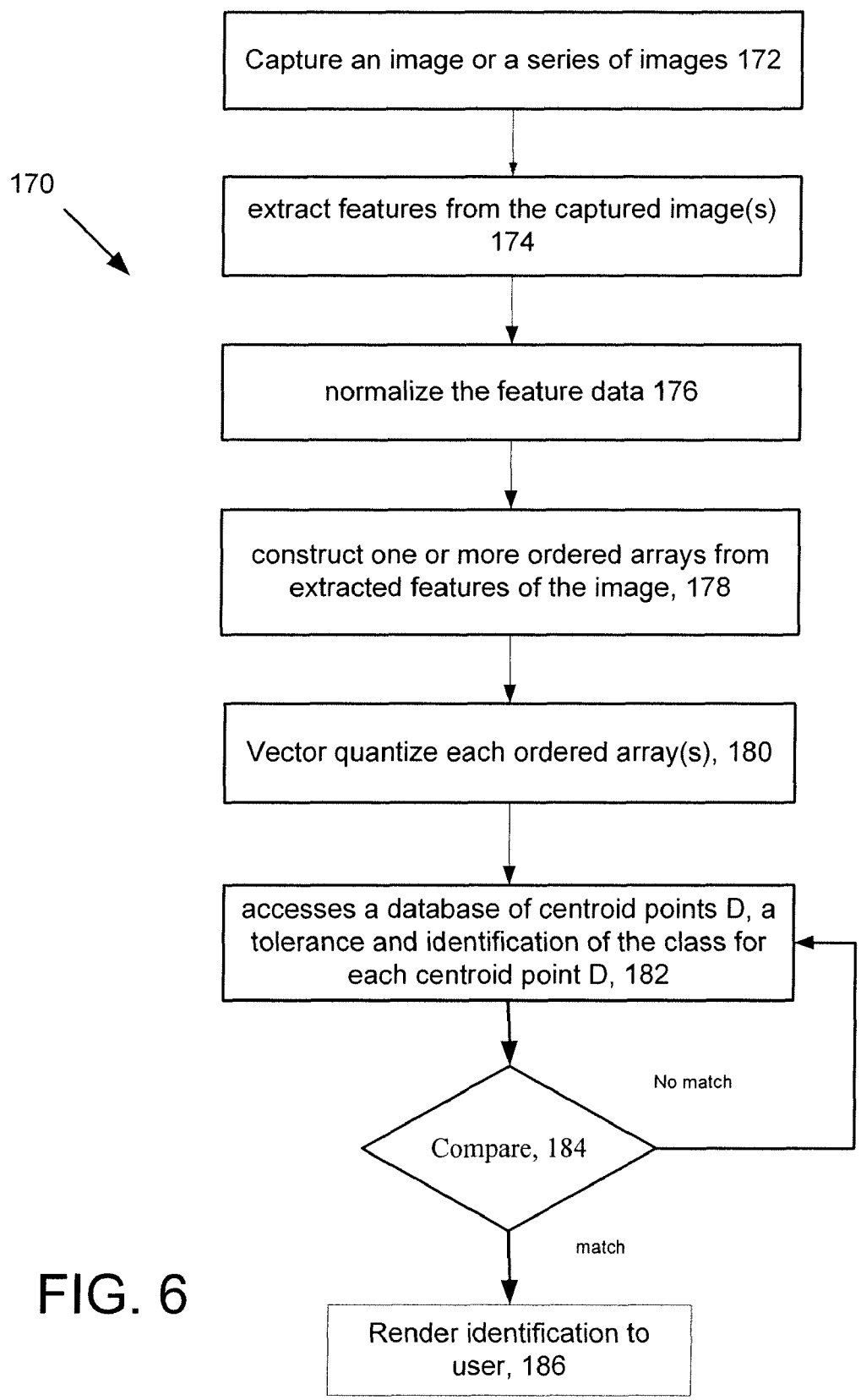
FIG. 6 is a flow chart of generalized object recognition.

Referring to FIG. 6, generalized object recognition 180 is shown. Generalized object recognition 180 applies generalized object recognition in a user's environment and involves recognition of pre-programmed object classes using centroids of clusters to represent objects belonging to a particular class of objects, as discussed above.

In generalized object recognition 170, the portable reading machine 10 captures 172 an image or a series of images and extracts 174 features from the captured image(s).

The portable reading machine 10 normalizes 176 the feature data and constructs 178 one or more ordered arrays from extracted features of the image(s). If multiple images are used, the portable reading machine 10 processes the corresponding multiple ordered arrays to provide a set of ordered arrays that are, e.g., an average of the ordered arrays extracted from the multiple images. Alternatively, the portable reading machine can use a single image and process the constructed ordered array(s) in recognition mode to attempt to find a match to one or more of the pre-processed classes of objects stored in the reading machine. Approaches described above for feature generation can be used.

The reading machine 10, after constructing the one or more arrays, vector quantizes the array 180 to provide a point in n-dimensional space for the order array, each ordered array(s) or a an averaged ordered array, as the case may be. The vector quantization is performed in a similar manner as discussed above.

After a vector quantization, the process accesses 182 a database of pre-stored centroid points D, along with a tolerance, (e.g., a standard deviation, variance etc.) and an identification of the class for each centroid point D. This database is provided for example, during manufacture of the reading machine, or is downloaded over a network or loaded via a memory card, etc. so that as new classes of objects are processed, data representing such new classes of objects can be loaded into the machine 10.

The pre-stored centroid data are compared 184 to the point(s) in n-dimensional space determined above to find one (or more) matches. If there is a match the identification for that cluster represented by the matching centroid for that cluster is retrieved and the identification is rendered 186 to the user, for instance text corresponding to the result can be fed to text to speech synthesis software to allow the reading machine 10 to convey the identification to the user, via audio output. Matching can be conveyed in various manners such as being expressed as a probability of match given the relative closeness of the quantized array 180 to pre-stored centroid points D.

On the other hand if more than one match is provided, then the reading machine can provide the best match (e.g., by the minimum distance from the determined point and the retrieved matching centroids, and retrieve the identification of the best matching class or can convey to the user all of the matching classes found.

If no match is found, the next centroid is retrieved to determine whether there exists a match to the determined point or point(s) if multiple arrays were quantized into multiple points in n-dimensional space. In addition, the image can be partly occluded and thus not all features may match but there could still be conveyed a probability of a match to the user.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

An example of one such type of computer is a programmable processing system (system) suitable for implementing or performing the apparatus or methods of the invention. The system includes a processor, a random access memory (RAM, a program memory (for example, a writable read-only memory (ROM) such as a flash ROM), a hard drive controller, and an input/output (I/O) controller 3coupled by a processor (CPU) bus. The system can be preprogrammed, in ROM, for example, or it can be programmed (and reprogrammed) by loading an operating system and a program from another source (for example, from a floppy disk, a CD-ROM, or another computer).

The hard drive controller is coupled to a hard disk suitable for storing executable computer programs, including programs embodying the present invention, and data including storage. The I/O controller is coupled by means of an I/O bus to an I/O interface. The I/O interface receives and transmits data in analog or digital form over communication links such as a serial link, local area network, wireless link, and parallel link.

A number of embodiments of the invention have been described. Thus, it will be understood that various modifications may be made without departing from the spirit and scope of the invention. Accordingly, other embodiments are within the scope of the following claims.

What is claimed is:

1. A method of operating a reading machine, the method comprising:
    capturing an image by an image capture device on the reading machine;
    operating the reading machine in a mode that performs generalized object recognition, by:
        forming by the reading machine an N-dimensional features vector, the features vector comprising a header portion having fields including a field identifying the image used to produce the features vector, a field identifying the object, and a field identifying the class of the object and an array portion comprising fields that correspond to values based on features of the image, the features corresponding to characteristics of the object depicted in the image;
        representing by the reading machine the values portion of the features vector as a point in n-dimensional space, where n corresponds to N, the number of features in the features vector;
        retrieving centroid points, a tolerance, and identification of the class of objects for the retrieved centroid points;
        comparing by the reading machine the point in n-dimensional space to centroid points that represent clusters of points in the n-dimensional space corresponding to classes of objects to determine, which of the classes of objects correspond to the point; and
    rendering the reading machine to a user, identification information based on the determined class of objects.

2. The method of claim 1 wherein the image is a received image from an image input device associated with the reading machine.

3. The method of claim 1 further comprising:
    populating by the reading machine the fields in the header portion of the features vector to identify the object that appears in the captured image based on the determined class of object; and
    normalizing feature data that populates the array portion to account for spatial variations.

4. The method of claim 1 further comprising:
    capturing an image or series of images to form a series of arrays.

5. The method of claim 1 further comprising:
    retrieving an identification corresponding to a centroid that matches the point in n-dimensional space.

6. The method of claim 1 wherein rendering further comprises:
    producing an auditory output to a user to render the identification information based on the determined class of objects.

7. The method of claim 1 further comprises:
receiving a tolerance associated with the centroid; and wherein comparing determines whether the point is within a distance from the centroid that is less than the tolerance associated with the centroid.

8. The method of claim 7 wherein the tolerance is at least one of variance, standard deviation.

9. The method of claim 1 wherein the centroid that represents a cluster of points is stored in a database and includes a value of the centroid and identification information that identifies a class of objects that the centroid represents.

10. The method of claim 1 wherein forming the N-dimensional features array uses the Scale Invariant Feature Transform (SIFT) to transform image data into scale-invariant coordinates relative to local features.

11. A reading machine comprising:
a processing device;
a computer program product residing on a computer readable medium for controlling operation of the reading machine, comprising instructions for causing the machine to:
capture an image by an image capture device on the reading machine;
operate the reading machine in a mode that performs generalized object recognition, by instructions to:
form an N-dimensional features vector, the features vector comprising a header portion having fields including a field identifying the image used to produce the features vector, a field identifying the object, and a field identifying the class of the object and an array portion comprising fields that correspond to values based on features of the received image, the features corresponding to characteristics of the object depicted in the image;
represent the values portion of the features vector as a point in n-dimensional space, where n corresponds to N, the number of features in the features vector;
retrieve centroid points, a tolerance, and identification of the class of objects for the retrieved centroid points;
compare the point in n-dimensional space to centroid points that represent clusters of points in the n-dimensional space corresponding to classes of objects to determine, which of the classes of objects correspond to the point; and
render by the reading machine to a user, the identification information based on the determined class of objects.

12. The reading machine of claim 11 further comprises:
an image input device that captures the received image.

13. The reading machine of claim 11 wherein the computer program product comprises instructions to:
populate the fields in the header portion of the features vector to identify the objects that appear in the captured image based on the determined class of object; and
normalize features data that populates the array portion to account for spatial variations.

14. The reading machine of claim 11 wherein the computer program product comprises instructions to:
retrieve an identification corresponding to a centroid that matches the point n-dimensional space.

15. The reading machine of claim 11 wherein the computer program product comprises instructions to:
produce an auditory output to a user to render the identification information based on the determined class of objects.

16. The reading machine of claim 11 wherein the computer program product comprises instructions to:
receive a tolerance associated with the centroid; and wherein the instructions to compare,
determine whether the point is within a distance from the centroid that is less than the tolerance associated with the centroid.

17. The reading machine of claim 11 further comprises:
a database of centroids that represent classes of objects.

18. A computer program product tangibly embodied on a computer readable storage device for performing object recognition by a reading machine, the computer program product comprising instructions for causing the reading machine to:
receive an image captured by an image capture device on the reading machine;
operate the reading machine in a mode that performs generalized object recognition, by instructions to:
form an N-dimensional features vector, the features vector comprising a header portion having fields including a field identifying the image used to produce the features vector, a field identifying the object, and a field identifying the class of the object and an array portion comprising fields that correspond to values based on features of the received image, the features corresponding to characteristics of the object depicted in the image;
represent the values portion of the features vector as a point in n-dimensional space, where n corresponds to N, the number of features in the features vector;
retrieve centroid points, a tolerance, and identification of the class of objects for the retrieved centroid points;
compare the point in n-dimensional space centroid points that represent clusters of points in the n-dimensional space corresponding to classes of objects to determine, which of the classes of objects correspond to the point; and
rendering by the reading machine to a user, the identification information based on the determined class of objects.

19. The computer program product of claim 18 further comprises instructions to:
populate the fields in the header portion of the features vector to identity the objects that appear in the captured image based on the determined class of object; and
normalize features data that populates the array to account for spatial variations.

20. The computer program product of claim 18 further comprises instructions to:
retrieve an identification corresponding to a centroid that matches the point in n-dimensional space.

21. The computer program product of claim 18 further comprises instructions to:
produce an auditory output to a user to render the identification information based on the determined class of objects.

22. The computer program product of claim 18 further comprises instructions to:
receive a tolerance associated with the centroid; and wherein the instructions to compare,
determine whether the point is within a distance from the centroid that is less than the tolerance associated with the centroid.

23. A reading machine comprising:
circuitry to receive an image; and
circuitry to form an N-dimensional features vector, the features vector comprising a header portion having fields including a field identifying the image used to produce the features vector, a field identifying the object, and a field identifying the class of the object and an array portion comprising fields that correspond to values based on features of the received image, the features corresponding to characteristics of the one object depicted in the image;

circuitry to represent the values portion of the features vector as a point in n-dimensional space, where n corresponds to N, the number of features in the features vector;

circuitry to retrieve centroid points, a tolerance, and identification of the class of objects for the retrieved centroid points;

circuitry to compare the point in n-dimensional space to centroid points that represent clusters of points in the n-dimensional space corresponding to classes of objects to determine, which of the classes of objects corresponds to the point; and circuitry to render the identification information based on the determined class of objects.

24. The reading machine of claim 23 further comprises:
an image input device that captures the received image.

25. The reading machine of claim 23 further comprises:
circuitry to retrieve an identification corresponding to a centroid that matches the point in n-dimensional space.

26. The reading machine of claim 23 further comprises:
circuitry to produce an auditory output to a user to identify the object class or object associated with the received image.

27. The reading machine of claim 23 further comprises:
circuitry to receive a tolerance associated with the centroid; and
circuitry to determine whether the point is within a distance from the centroid that is less than the tolerance associated with the centroid.

28. The reading machine of claim 23 further comprises:
a database of centroids that represent classes of objects.

* * * * *